Sept. 16, 1924.

C. M. HENDERSON

AUTOMOBILE CHAIN FASTENER

Filed Oct. 17, 1923

1,508,517

Inventor
Clara M. Henderson

By
Her Attorneys

Patented Sept. 16, 1924.

1,508,517

UNITED STATES PATENT OFFICE.

CLARA MAY HENDERSON, OF YARMOUTH, IOWA.

AUTOMOBILE CHAIN FASTENER.

Application filed October 17, 1923. Serial No. 669,127.

*To all whom it may concern:*

Be it known that I, CLARA M. HENDERSON, a citizen of the United States, residing at Yarmouth, in the county of Des Moines and State of Iowa, have invented certain new and useful Improvements in Automobile Chain Fasteners, of which the following is a specification, reference being had therein to the accompanying drawings.

This invention relates to an automobile chain fastener, and particularly to a fastener adapted to connect the ends of an antiskid chain together.

The object of the invention is the construction of a simple and efficient fastener that can be readily attached to a chain and which can be easily manipulated by the operator for attaching the ends of a chain together or the detaching of the ends.

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a view, in side elevation, of a device constructed in accordance with the present invention, while

Figure 1:
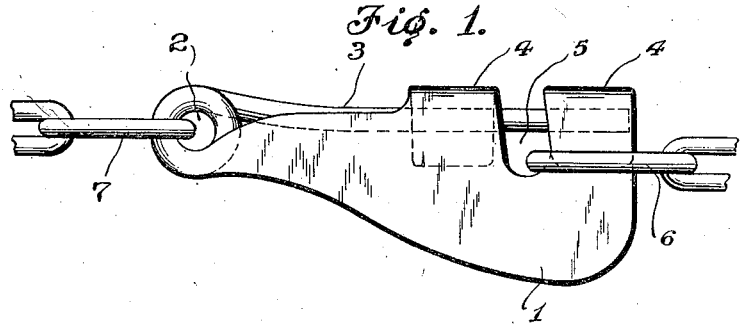
Figure 2:
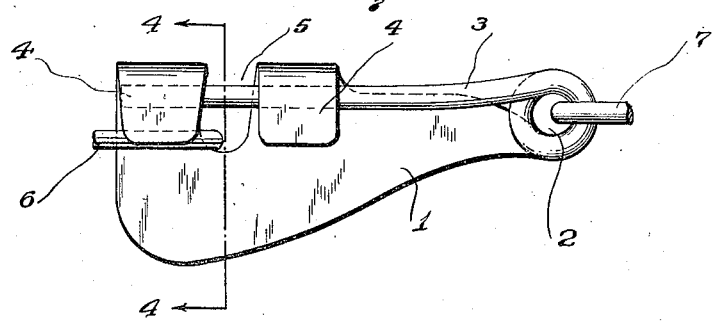
Figure 2 is a similar view, looking at the side of the same.
Figure 3:
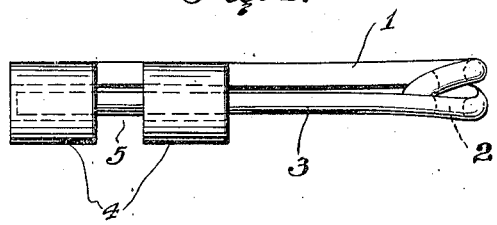
Figure 3 is a top plan view of the device.
Figure 4:
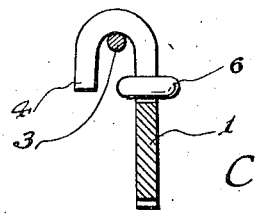
Figure 4 is a sectional view, taken on line 4—4, Fig. 2.

Referring to the drawings by numerals, 1 designates an elongated body that is formed at one end into a coil spring eye 2, which eye terminates in a long spring catch or securing bar 3. Extending from the upper edge of the body, and near the edge opposite to the spring eye 2, are prongs 4; there are preferably two of these prongs producing a slot 5 therebetween, into which a link 6, at one end of the chain, may be placed. The link 7, at the opposite end of the chain, is placed in the eye 2. Upon the spring catch 3 being moved into position under the prongs 4, the link 6 will be held securely upon the body 1. By moving the spring catch 3 from under, or away from, the prongs 4, the link 6 can be readily removed from the slot 5 for disconnecting the ends of the chain.

It is to be noted that the body is enlarged toward the end carrying the prongs 4, whereas at the opposite end it is narrowed down and terminates in the coil spring eye 2, all being formed from a single piece of metal, and, therefore, can be manufactured somewhat inexpensively.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. A chain fastener comprising a body having a spring element at one end and a securing bar extending from the spring element longitudinally of the body at one side thereof, a prong extending transversely from the other end of said body and a prong extending from the body in spaced relation to the first prong, said body being provided with a recess extending transversely thereof from between said prongs and adapted to receive a chain link put in place about the first prong, said securing bar when engaged with said prongs extending across the recess to retain the chain link in place.

2. A chain fastener comprising a body, prongs extending transversely from one end portion of said body and spaced longitudinally of the body, said body being provided with a recess leading from between said prongs and adapted to receive a chain link passed over the end prong and end portion of the body, and a securing bar extending longitudinally of the body and having its free end engageable with the prongs to retain the link in the recess.

3. As a new article of manufacture, a fastening device formed from a single piece of metal and including an elongated body provided near one end and upon its upper edge with a pair of overhanging prongs and with a chain link receiving slot between said prongs, said body being comparatively wide at the end provided with the prongs and narrowing down to its opposite end and terminating in a coil spring eye, said coil spring eye terminating in a long spring catch, and said spring catch adapted to be placed under the prongs contiguous to the body, to retain a chain link in the slot, substantially as shown and described.

In testimony whereof I hereunto affix my signature.

CLARA MAY HENDERSON.